Jan. 20, 1942.  J. M. WITHEY  2,270,488
FISH BAIT
Filed June 21, 1941
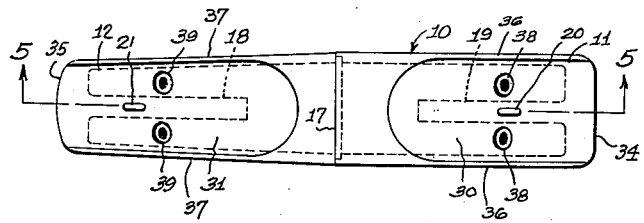
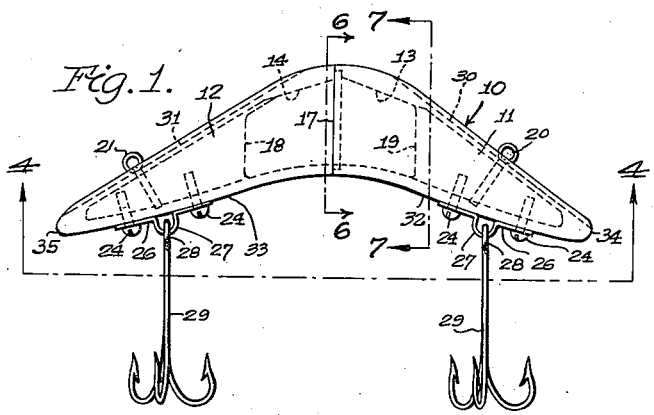
Inventor
John M. Withey
By
Bartlett Ruggles
Attorneys Patented Jan. 20, 1942

2,270,488

UNITED STATES PATENT OFFICE 2,270,488

FISH BAIT

John M. Withey, Howell, Mich.

Application June 21, 1941, Serial No. 399,139

4 Claims. (Cl. 43—46)

This invention relates to fish baits and in particular to fish baits used for casting or trolling.

One object of this invention is to provide a fish bait which will travel through the water at different depths for the same speed, according to the desire of the fisherman.

Another object is to provide a fish bait which when towed or pulled from one end will travel at a different depth than when it is towed or pulled from the other end.

Another object is to provide a fish bait which may be pulled from either end to travel at different depths, and which has an oscillating action as it is pulled through the water.

Another object is to provide a fish bait having a pair of arms joined at an angle, one arm swinging to and fro when the bait is drawn through the water by a line connected to the other arm.

Another object is to provide a fish bait of an approximate boomerang shape with wedge-shaped arms wherein the bait can be pulled from either end and made to travel at different depths through the water according to the end from which it is being pulled.

In the drawing:

Figure 1 is a side elevation of a preferred embodiment of a fish bait according to this invention.

Figure 2 is a top plan view of the fish bait shown in Figure 1.

Figure 3 is a right-hand end elevation of the fish bait shown in Figure 2.

Figure 4 is a section along the line 4—4 in Figure 1, constituting a bottom plan view with the hook shanks in cross section.

Figure 5 is a central longitudinal section through the fish bait shown in Figure 1 taken along the line 5—5 in Figure 2.

Figure 6 is a cross section along the line 6—6 in Figure 1.

Figure 7 is a cross section along the line 7—7 in Figure 1.

Figure 8 is a diagrammatic perspective view on a small scale showing the action of the bait as it is drawn through the water.

In general, the fish bait of this invention is a casting or trolling bait which can be pulled or towed from either end. If the bait is towed from one end, it travels at a shallow level, whereas if it is towed from the other end, it travels at a deep level. The bait itself is approximately in the shape of a boomerang and consists of a pair of wedge-shaped arms united at their bases with their center lines at an obtuse angle to each other. The free arm swings to and fro sidewise as the other arm is pulled. The two wedge portions are slightly dissimilar and the screw eyes for attaching the line are in slightly different positions so that the bait will travel at a deeper level for a given speed when towed from one end than from the other. The bait is preferably made of hollow plastic material to give it durability and uniformity of characteristics. The free ends of the wedge-shaped portions of the arms may be of slightly different widths and their upper surfaces are preferably slightly concaved.

Referring to the drawing in detail, Figure 1 shows the fish bait 10 of this invention as consisting of a pair of wedge-shaped arms 11 and 12 formed with hollow cavities 13 and 14 respectively. The arms 11 and 12 are respectively provided with interlocking joints 15 and 16 (Figure 5) whereby they may be joined at their bases along the junction line 17. The arms 11 and 12 adjacent their free ends are provided with central longitudinal ribs 18 and 19 extending from top to bottom of the interior walls and providing an anchorage for screw eyes 20 and 21 mounted in holes 22 and 23 respectively (Figure 5). The ribs 18 and 19 also provide an anchorage for screws 24 threaded into holes 25 extending upwardly from the bottom of the bait and serving to secure straps 26 to the bait. The straps 26 are provided with central loops 27 which pass through the eyes 28 of the triple hooks 29 mounted at opposite ends of the bait 10.

The two wedge-shaped arms 11 and 12 are preferably provided with upper surfaces 30 and 31 which are concaved lengthwise of the bait (Figure 7). The bottom surfaces 32 and 33 are preferably convexly rounded (Figures 6 and 7). The arms 11 and 12, while of substantially the same diameter at their junction line 17, optionally taper toward their opposite ends 34 and 35 respectively (Figures 2 and 4). These ends 34 and 35 may be of different widths so that the side walls 36 of the arm 11 taper by a different amount than the side walls 37 of the arm 12. The screw eyes 20 and 21 are also optionally arranged at different distances from the ends 34 and 35. The locations of the screw eyes 20 and 24 assist in determining the diving and travelling characteristics of the bait. The bait may be provided with eyes 38 and 39 at its opposite ends adjacent the screw eyes 20 and 21 respectively.

The arm 11 is shorter and has a greater angle between its opposite sides 30 and 32 than the longer arm 12 with its smaller angle between its upper and lower surfaces 31 and 33. When the bait is towed by the screw eye 20 of the shorter arm 11, therefore, the bait goes deeper for a given speed than when it is towed by the screw eye 21 of the longer arm 12 with the smaller angle between its upper and lower surfaces 31 and 33.

In operation, when the line is attached to one of the screw eyes and the bait is drawn through the water, the arm to which the line is attached assumes an inclined position in the water, whereas the free arm assumes an approximately level position with its upper surface very nearly horizontal. As the bait is drawn through the water, the free arm swings to and fro with an action resembling the wagging of a dog's tail. When the line is attached to the screw eye 20 of the thicker arm 11, the bait travels down to a deep level and remains approximately at that level while it is being towed at a given speed. If, on the other hand, the line is attached to the screw eye 21 of the thinner arm 12, the bait dives to a shallow level and remains at that level while the speed remains constant. When the speed is increased, the bait moves downward to a deeper level, and when decreased, the bait moves upward to a shallow level. When the bait is at rest, it floats with the central portion or hump at the junction line 17 slightly above the water, the bait floating approximately in the position shown in Figure 1. When the bait is being drawn through the water, however, it occupies the position shown in Figure 8, the free arm swinging to and fro horizontally as indicated by the dotted lines and arrows. The tied arm moves to and fro very slightly while it is being drawn through the water, the screw eye to which the line is attached serving as a pivot for the motion.

The hollow chamber formed by the recesses 13 and 14 within the bait causes the bait to float when it is at rest. The bait is preferably constructed of plastic material, which provides ease in manufacturing and uniformity in characteristics, as well as comparative freedom from scratching or marring. The plastic material also provides an excellent foundation for the variety of colors and designs with which such baits are ornamented.

The fish bait of the present invention is well balanced and therefore is ideally suited for bait casting, as from a bait casting rod. It may also be towed from either end when attached to an ordinary trolling line and towed from a boat.

While a specific embodiment of the invention has been described and illustrated, it will be understood that various modifications may be made within the scope of the appended claims without departing from the spirit of the invention.

What I claim is:

1. A fish bait comprising a pair of wedge-shaped arms interconnected at their bases, one arm having a greater length than the other arm, said arms having hollow chambers therein, ribs in said chambers extending between the opposite walls of said arms, and line attachment means secured in at least one of said ribs.

2. A fish bait comprising a pair of wedge-shaped arms interconnected at their bases, one arm having a greater length than the other arm, one arm having a hollow chamber therein, a rib in said chamber extending between the opposite walls of said arm, and a hook secured to said rib.

3. A fish bait comprising a pair of wedge-shaped arms interconnected at their bases, one arm having a greater length than the other arm, one arm having a hollow chamber therein, a rib in said chamber extending between the opposite walls of said arm, a hook secured to said rib, and line attachment means secured to said rib on the opposite side from said hook.

4. A fish bait comprising a pair of wedge-shaped arms interconnected at their bases, one arm having a greater apex angle than the other arm, the upper surfaces of said arms being longitudinally concave and the lower surfaces thereof being longitudinally convex.

JOHN M. WITHEY.